United States Patent

Nahi et al.

[19]

[11] Patent Number: 6,084,584
[45] Date of Patent: Jul. 4, 2000

[54] COMPUTER SYSTEM SUPPORTING PORTABLE INTERACTIVE GRAPHICS DISPLAY TABLET AND COMMUNICATIONS SYSTEMS

[75] Inventors: Paul B. Nahi, San Francisco; Daniel W. Wright, San Jose, both of Calif.

[73] Assignee: Diamond Multimedia Systems, Inc., San Jose, Calif.

[21] Appl. No.: 08/725,004

[22] Filed: Oct. 1, 1996

[51] Int. Cl.[7] .............................. G06F 3/00; G06F 15/16
[52] U.S. Cl. .......................... 345/329; 345/2; 345/156; 345/522; 395/200.33
[58] Field of Search .................................. 345/329, 332, 345/326, 169, 156, 2, 504, 522, 526; 395/200.33, 200.31, 200.38, 683

[56] References Cited

U.S. PATENT DOCUMENTS

| | | | |
|---|---|---|---|
| 5,349,678 | 9/1994 | Morris et al. | 395/200.33 X |
| 5,539,658 | 7/1996 | McCullough | 345/329 |
| 5,546,538 | 8/1996 | Cobbley et al. | 395/200.33 |
| 5,627,977 | 5/1997 | Hickey et al. | 345/329 |
| 5,754,774 | 5/1998 | Bittinger et al. | 395/200.33 |
| 5,854,624 | 12/1998 | Grant | 345/169 |

OTHER PUBLICATIONS

"You Can't Take it With You: Pilot Puts Information in Hand", Dylan Tweney, Infoworld, May 13, 1996, p. 118.
"Microsoft Gets Pegasus OS Ready for New PDAs", Carolyn A. April, Infoworld, May 6, 1996, p. 14.

*Primary Examiner*—Raymond J. Bayerl
*Attorney, Agent, or Firm*—Gerald B. Rosenberg; New Tech Law

[57] ABSTRACT

A portable display tablet is operated in conjunction with a base computer system including a host processor for executing an application program with an operational function that generates graphics data and operates in response to input data. The computer system includes a wireless data transceiver coupled to the processor that is capable of communicating the graphics and input data between the computer and portable display tablet. The portable display tablet includes a graphics display panel for displaying the graphical data, a low power wireless data transceiver providing short range data communication of the graphics and input data between the base computer system and portable display tablet, and a controller, embedded within the portable display tablet and coupled to the low power wireless data transceiver, that executes a control program to process the graphics data to provide the graphical display data to the graphics display panel.

20 Claims, 6 Drawing Sheets

COMPUTER SYSTEM SUPPORTING PORTABLE INTERACTIVE GRAPHICS DISPLAY TABLET AND COMMUNICATIONS SYSTEMS

CROSS-REFERENCE TO RELATED APPLICATIONS

The present application is related to 1) SHARED VIRTUAL DESKTOP COLLABORATIVE APPLICATION SYSTEM, Daniel W. Wright, application Ser. No. 08/503,453, Filed Jul. 17, 1995 which is assigned to the Assignee of the present Application:

The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

1. Field of the Invention

The present invention is generally related to portable, interactive communications systems and, in particular, to a portable interactive display tablet that permits immediate area interactive access to and the use of a computer system that may, in turn, be coupled to local area and wide area networks in support of communications and other application programs.

DESCRIPTION OF THE RELATED ART

During the past few years, there has been a substantial interest in developing a new class of personal computers that can provide a low cost option for accessing remote network connected computer systems. Interest in this kind of network computer (NC), also variously referred to as a thin client, has been most recently driven by the substantial growth of Internet accessible resources including, in particular, the World Wide Web (WWW, W3 or the "Web"). The existing descriptions for the NC, only a few of which have appeared in prototype form, describe a so-called set-top box that is connected to a home television type monitor. A cabled or possibly infrared transmitter based keyboard device connected to the NC provides both pointing and alpha-numeric inputs to the NC. With the television monitor acting as the video output device, the NC itself is required only to implement a presumed minimum of functions including a thin network protocol, a network interface, a video display interface, an input interface and just sufficient computational and memory resources to minimally support operation of at least a dedicated Web browser application. A few other output interfaces may also be provided to allow connection to other output devices such as printers and speakers.

Thus, the known existing designs for NCs utilize a basic computer architecture that is not significantly different from that of conventional personal computers that are meant to be replaced by NCs. However, the significant market forces of low cost and web enabled functionality are generally believed to greatly favor the NCs. Indeed, by leveraging the cost of an output display by the use of a pre-existing conventional television, the NC obviates the nominally most expensive single cost item of a personal computer: a conventional large screen computer monitor.

A simple, basic operating system dedicated to supporting execution of dedicated Web browser type application, potentially extended to support game programs, and other modest programs on the NC, reduces the expected complexity of use while maintaining a low cost. As an additional simplicity factor, the operating system is placed largely, if not entirely, in some form of non-volatile memory within the NC.

The reduction in user apparent complexity comes at the price of the NC being incapable of performing meaningfully without extensive network connected support. The only known alternative that would allow any significant local function would be to expand the embedded operating system to include generalized application program interfaces (APIs) to support existing and future developed applications. The computational and memory resources of the NC would also need to be greatly expanded to adequately execute such applications. Furthermore, advanced operating system features such as multi-tasking would need to be supported by the NC if only to maintain reasonable parity with the basic functionality of current day personal computers. Consequently, the NC and embedded operating systems would need to maintain most of the significant features and characteristics of a full fledged personal computer and operating system to support the local execution of personal computer compatible applications.

Unfortunately, the execution performance and memory resources of the NC are intentionally quite limited as part of the basic NC design principles and goals. NCs have been proposed in a cost range of approximately $500 to $1,000 per NC. At this price point, the industry apparently believes that the limited local, network restricted performance and functionality presented by an NC will not be a bar to wide acceptance at least as a consumer home electronics product.

There are, however, substantial disadvantages to utilizing NCs of the above conventional definition. First, utilization of an existing television as the output display directly compromises the use of the television for any other purpose while being used with the NC. Since the exploration of the Web tends to be more of a solitary activity, the utilization of a family television will significantly detract from the ordinary family use of the television. The alternative of purchasing an extra television for use as the output display device separate from the family television largely defeats the low cost price point that the industry considers essential for obtaining wide adoption and use of NCs.

An alternative is to leverage the use of multiple existing televisions for use with the NC. However, as currently proposed, either a separate NC would be required for each television that is to be utilized as an output device or an NC would have to be carried and manually connected to an available television; televisions are, as a practical matter, immobile. Furthermore, each individual NC would be effectively tied to a respective television output device and thereby rendered essentially immobile, at least during use. Utilization of an NC would be precluded by definition in any room where either a television is not present or cannot be connected to an NC. In the conventional home, there are many such rooms and other spaces where use of an NC might prove quite desirable. Consequently, the proposed designs for NCs are, in fact, quite restrictive on the manner and location of using an NC, even if only as a consumer home electronics entertainment device. Whether the conventional NC design will become a standard form of consumer electronics used to access Internet resources has yet to be seen.

There are a number of other, if not low cost then highly functional, computer systems that can be utilized to access Internet resources from the home. Besides the conventional home personal computers and notebook computers, there exists a number of different personal digital assistants (PDAs) that can be utilized to execute applications for accessing Web resources. The Apple Newton™ and Motorola Envoy™ are examples of two well known PDA designs. Both may include a flat panel touch screen that functions as both an input and output device, an embedded proprietary operating system, and a fairly high performance CPU provided with a relatively large program execution and display data memory spaces to support execution of significantly complex if not multiple independent applications. In addition, these PDAs can also incorporate a cellular telephone interface that maybe utilized to establish an Internet connection. In some cases, the cellular telephone is integrated within the PDA.

As might be expected by the functionality provided by conventional PDAs, the cost of PDAs, even discounted as consumer electronics, is well over a thousand dollars, if not several thousand dollars in cost per unit. Although PDAs capable of establishing an Internet connection have existed for some time, such PDAs have not been generally accepted as either a business or a consumer home electronics product, in general, let alone for use in accessing the Internet.

Other, typically proprietary handheld devices exist for use most often in the field collection of data. A handheld device dedicated for use in warehouse inventory applications may typically include a bar code scanner, alpha-numeric keyboard, and a small LED or LCD display suitable for presenting prompting messages and status codes to the user. A proprietary protocol is sometimes utilized over a short haul radio transceiver link between the handheld device and a bass transceiver connected to the inventory management main computer system.

Because of the quite dedicated and thereby limited functionality inherent in the special purpose, if not function dedicated nature of handheld devices, these devices are considered solely as commercial products to be utilized selectively with proprietary computer systems and specialized applications. There is presently no generally known business or consumer utilization of such handheld devices of any significance outside of their use in dedicated applications. Furthermore, the highly limited display size that is typical on these handheld device intrinsically makes them unsuited for use in accessing the very graphics oriented Internet resources such as the Web.

Consequently, there is a present and future need for a computer access device capable of being targeted as a consumer electronics product that enables access to Internet related resources including the Web at low cost without compromise of performance.

SUMMARY OF THE INVENTION

Thus, a general purpose of the present invention is to provide a portable or free roaming field function computer enabled access device suitable for use as a consumer home electronics product and potentially in business markets.

This is achieved through the use of a portable display tablet that is operated in conjunction with a base computer system including a host processor for executing an application program with a predetermined operational function that generates predetermined graphics data and operates in response to predetermined input data. The computer system also includes a wireless data transceiver coupled to the processor that is capable of communicating the predetermined graphics and input data between the computer and portable display tablet. The portable display tablet comprises a graphics display panel for displaying predetermined graphical data, a low power wireless data transceiver providing short range data communication of the predetermined graphics and input data between the base computer system and portable display tablet, and a controller embedded within the portable display tablet and coupled to the low power wireless data transceiver that executes a control program to process the predetermined graphics data to provide the predetermined graphical display data to the graphics display panel.

Thus, an advantage of the present invention is that the portable display tablet provides a low cost, wireless display and input data interface to a local host computer system that, in turn, is utilized to execute application programs. These application programs are generally unrestricted in either locally producing graphical display data or to obtain and process graphical display data from remote sites over local area and wide area networks.

Another advantage of the present invention is that multiple portable display tablets can be utilized in conjunction with a single base computer system to separately and collaboratively provide access to applications executing on the base computer system.

A further advantage of the present invention is that a substantial data transceiver bandwidth can be supported over short ranges so as to reasonably enable the display of large frame graphical data on the portable display tablet.

Still another advantage of the present invention is that graphical data may be efficiently transferred from the local host computer system to the portable display tablet by compressing the graphical display data prior to transmission by the local host computer system to the portable display tablet or by maintaining the compressed form of graphical display data between generational or receipt of such data by the local host computer system and transmission to the portable display tablet.

Yet another advantage of the present invention is that only a relatively small, cost efficient embedded controller need be implemented in the portable display tablet to implement all required functions related to the receipt and presentation of output data and the return transmission of input data.

A still further advantage of the present invention is that the embedded control system implemented in the portable display tablet generally need not handle or manage any issues arising from the number or nature of the application programs executing on the base computer system that contribute in any respect to the graphical display data communicated to the portable display tablet. As such, the portable display tablet has essentially no processing requirements that are specific to any particular application executed by the base computer system. Additional processing functions such as the use of a graphics display accelerator or graphics display data decompressor are utilized globally by the portable display tablet independent of the specific identity and function of any particular application program.

Yet still another advantage of the present invention is that a relatively small tablet control program can be executed on the base computer system to optimize the use of the transceiver bandwidth between the local host computer system and portable display tablet. This control program can be executed efficiently by the local host computer system to identify, for example, existing compressed graphical data blocks that can be transmitted directly in like form to the portable display tablet in place of any uncompressed representation of the same data block. A mechanism and method of correlating compressed and uncompressed representations of the same data block is provided through the control program executed by the computer system and the embedded control system operating the portable display tablet. Accordingly, typically graphical data blocks are preferentially transmitted between the local host computer system and portable display tablet in a compressed form without limiting the functional operation of any application program executing on the local host computer system.

A yet further advantage of the present invention is that, in the invention's basic form, the tablet qualifies as a wireless communications product that does not require an operating license or the utilization of any non-local communications infrastructure, such as cellular or land-line telephone, while permitting a wide degree of portability of the display tablet around a typically statically located local host computer system. The display tablet is portable throughout an area corresponding to a conventional home and yard, thereby enabling a wide degree of freedom in the location and orientation of the use of the portable display tablet without any effective loss of functionality and resources, particularly including access through the local host computer system to external communications infrastructures that reach remotely connected data sources. Furthermore, the control program utilized to support a portable display tablet enables the concurrent support of multiple portable display tablets by a single local host computer system that can independently and collaboratively execute multiple application programs in support of the multiple portable display tablets.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
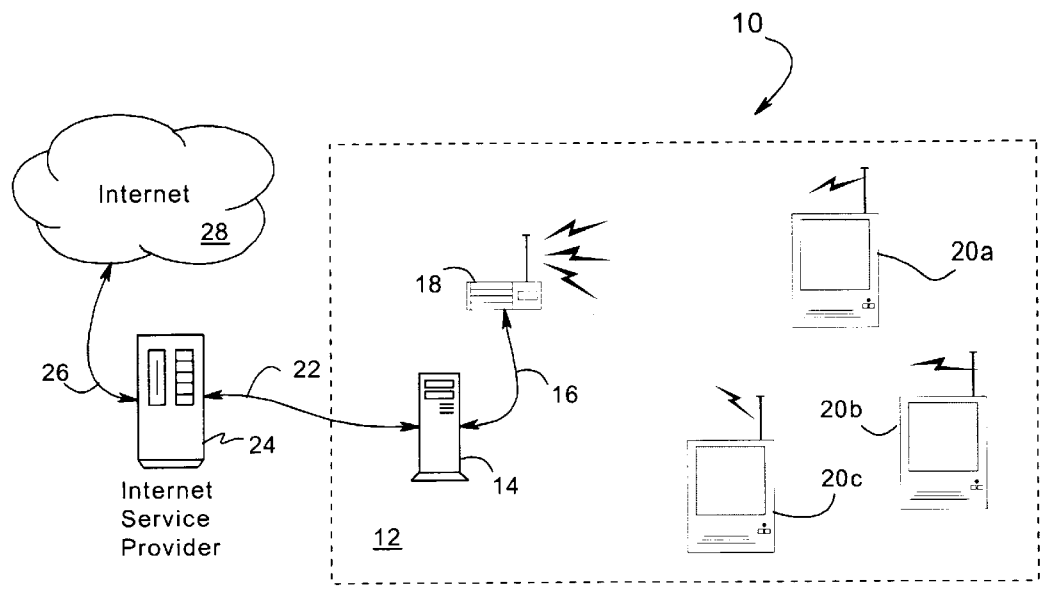
FIG. 1 provides a preferred operating environment for one or more portable display tablets in connection with a local host computer system within a local area and through the local host computer system to remote sources of data information.

The preferred system configuration 10 for utilizing a portable interactive display tablet in accordance with the present invention is shown in FIG. 1. Within a generally power limited restricted area 12, a local host computer system 14 executes an operating system and any number of application programs, potentially including communications programs in support of one or more portable display tablets within the restricted area 12. The host computer system 14 may utilize any of a number of common hardware platforms preferably utilizing a modest to high performance central processing unit (CPU) such as the Intel Pentium™, Motorola Power PC™, and Digital Equipment Corporation Alpha™. However, the present invention is not restricted to any particular hardware platform or type of processor, but rather may be implemented quite appropriately utilizing parallel computer arrays, mini computers and conventional specialized or proprietary function computer systems. The operating system executed by the host computer system 14 is preferably Microsoft Windows 95™ as modified consistent with the Shared Virtual Desktop Collaborative application system as described in the above cross-referenced application, which is hereby incorporated by reference. Other conventional single user operating systems, including Microsoft® Windows 3.11™ and IBM® OS/2™, modified to implement the Shared Virtual Desktop Collaborative application system can also be utilized in the implementation of the present invention. Multi-user operating systems such as Sun MicroSystems Solaris 2.0™, IBM AIX™, and Citrix WinFrame™, which is a multi-user variant of Microsoft® Windows NT 3.51™, may also be suitably utilized. Finally, the application programs executable by the host computer system 14 are substantially without restriction in relationship to limitations imposed or potentially imposed by the present invention. The applications may implement any of the conventional business, personal and game functions, particularly including communications. Preferably, the applications support, as appropriate, support multiple accesses to common data as required to maintain data integrity within a typical networked computer system environment.

The host computer system 14 preferably includes a peripheral interface adapter that provides for the bi-directional transfer of the data via an interconnect line 16 to an external transceiver 18 that supports wireless communications with one or more portable display tablets 20a–c operated within the restricted area 12. The transceiver 18, in a simple preferred embodiment, implements a low-power 900 Mhz transceiver. By maintaining operation below the Federal Communication Commission (FCC) regulated power limit of 2.4 watts transmitted power, the transceiver 18 can be operated without requiring FCC compliance licensing. With a transmit power of approximately 2 watts, the transceiver 18 is capable of easily supporting a restricted area 12 having a radius of from several hundred feet up to approximately 3,000 feet. In this simplest preferred embodiment, the transceiver 18 supports a single wireless channel, potentially selected out of many based on noise analysis, for communicating with a single portable display tablet 20a.

A more capable transceiver 18 may be constructed utilizing spread spectrum technology capable of supporting two to three megabyte per second data transceiver rates in the 2.4 Ghz frequency range. By conventional design, a spread spectrum transceiver 18 can support multiple concurrent wireless data transfer channels to a number of portable display tablets 20a–c. Utilizing a maximum transmit power rating that is below the regulated power limit established by the FCC, a spread spectrum transceiver 18 again establishes a restricted area 12 having a radius of at least several hundred to several thousand feet.

The portable display tablets 20a–c are preferably, in accordance with the present invention, relatively low cost graphics display and user input devices that allow a computer user to, in effect, operate the host computer system 14 in almost all respects without requiring a physical connection to the host computer 14 or, in preferred circumstances, even a physical power connector. Furthermore, the portable display tablet 20 has a weight of less than about four pounds and a size, approximately eleven by seventeen inches, that allows the tablet to be conveniently portable. Essentially the full function of the host computer system 14 can therefore be effectively carried and used freely throughout the entirety of the restricted area 12. In an expected typical use, the restricted area 12 will encompass a home living space, office suite, or local work area for one or more computer users. The host computer system 14 is located in a protected or well established location with access to a wide area communications channel 22, such as a high speed modem connection, ISDN connection, or the like, to a remote Internet service provider (ISP) 24 that serves as a conventional access provider between a wide area network such as the Internet 28 and the host computer system 14. As a consequence, system 10 provides a very high degree of access between highly portable, low-cost display tablets 20 that present the full functionality of a home or business computer system 14 without being tied physically to conventional computer display. Furthermore, portable display tablet 20 does not preempt the use of existing television sets within the restricted area 12 nor are the tablets confined to use only in rooms where a television and network computer are already provided and configured. The display tablets 20 of the present invention thus each provide a functionality far beyond that of a low performance network computer both in terms of performance and convenience. Indeed, the display tablets 20 supports the full functionality to support wide area access communication capability as conventionally provided by the host computer system 14. Furthermore, the display tablets 20 provides clear access to the full processing capability of a complete home or business computer system 14 for running applications that may or may not involve wide area communications access.

Figures 2A, 2B, 2C:
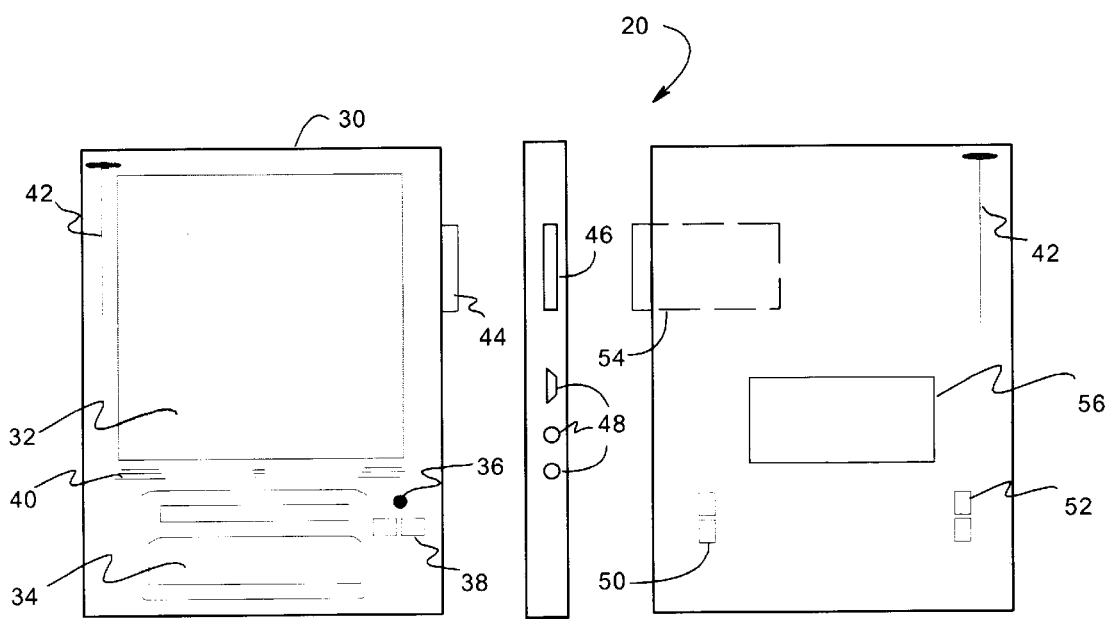
FIGS. 2a–c provide front, side and back illustrations of a portable display tablet constructed in accordance with a preferred embodiment of the present invention.

A portable display tablet 20 is shown in FIGS. 2a–c in exemplary front, side, and rear perspectives. A display tablet 20 is preferably constructed with a plastic case 30 housing a display panel 32, a mini keyboard 34, a pointing device 36, and pointer selection buttons 38. The display panel 32 is preferably an active matrix liquid crystal display (LCD) or dual-scan super-twist nematic display suitable for rendering color images at a resolution of about 640×480 pixels or greater. Low cost display panels 32 with reduced resolutions and only monochrome display capabilities can also be utilized. In all events, the display panel 32 is preferably light-weight, reasonably sturdy when and as mounted within the case 30, and suitable for the graphic display of at least computer video data.

The mini keyboard 34 may be of any number of conventional configurations providing for alpha-numeric keyed data entry in a relatively small two dimensional form factor. Ultimately, the mini keyboard 34 may be replaced with a smaller number of programmable function keys that programmatically adapt as appropriate to the function of any current application displayed by the display panel 32. The mini keyboard 34 may be entirely replaced with a virtual keyboard implemented by the display panel 32 in connection with a touch screen sensor (not shown) mounted in the case 30 thus full function and specialized function data entry keys can be created as necessary or desired in support of the use of any application displayed by the display panel 32.

A pointing device, such as a power point tracking device or track ball 36 is provided in a position generally as shown, that allow the display tablet 20 to be easily held while the pointing device 36 is manipulated. Similarly, pointer buttons 38 are preferably configured in close proximity to the pointing device 36 to again allow easy access and use while the display tablet 20 is held. Preferably, pointer buttons 38 may be programmable in defining the function performed or recognized in response to each press of the buttons 38.

A preferred embodiment of the present invention may also include an audio peck-up transducer and pair of speakers, generally indicated by the reference numeral 40, in support of multimedia utilization of the display tablet 20.

A transceiver antenna 42 is preferably mounted within the case 30. Although the display panel 32 and other electronics located within the case 30 may be electromagnetically shielded, the cross section of such shielding should not significantly affect the efficiency of the antenna 42. Where the shielding presents a problem or the display table 20 is operated near noise sources or at the near limit of the restricted area 12, the antenna 42 may be constructed to permit external extension generally as shown in FIG. 1.

The flexibility and functionality of the display tablet 20 may be augmented by the addition of a PCMCIA peripheral card 44. As conventional PCMCIA cards 44 are removable, the function or functions that can be added to the display tablet 20 depends on the implementation of the PCMCIA card 44 itself. A PCMCIA card 44 may implement a cellular phone interface, which would allow the display tablet 20 to be operated at great distance from the host computer 14 through a combination of air-links and land-lines that route to the host computer system 14 in a conventional manner. The PCMCIA card 44 may also implement an analog or digital modem or other high-speed serial or parallel interface that can connect either directly to the host computer 14 when the display tablet 20 is conveniently close to the host computer 14 or remotely through any combination of air-links and land-lines. The PCMCIA card 44 may also implement supplementary functions to augment the multimedia capabilities of the display tablet 22, other communications protocols and data connection systems, and upgrades to the basic capabilities present in the display tablet 20, including new encoding, encryption and compression capabilities.

As shown in FIG. 2b, the PCMCIA card 44 is accommodated by the display tablet 20 through a PCMCIA slot 46 accessible from a side of the display tablet 20. Additional connectors 48 may be provided on the side of the display tablet 20 for a variety of purposes. A connector 48 can provide external power access that provides operating power and, potentially, power for recharging batteries provided within the case 30 of the display tablet 20. Other connectors 48 may provide for conventional keyboard, mouse and joysticks, as external peripherals, to be fully integratable into the overall function of the display table 20.

A back view of the display tablet 20 is shown in FIG. 2c. Additional optional pointer control buttons 50, 52 may be provided on the back side of the display tablet in locations generally as shown that are conveniently reached by the fingers of a user holding a display tablet 20 in a normal viewing orientation with respect to the user. Placement of pointer control buttons 50, 52 on the rear of the display panel 20 supports both right and left handed use of the pointer control buttons 50, 52 either in place of or as a compliment to the front mounted buttons 38. Indeed, all of the available pointer control buttons may be utilized concurrently through separate programming as desired to achieve chosen input functions.

The PCMCIA card slot is shown in outline 54 to illustrate preferred position of the PCMCIA card slot in back of a portion of the display 32. Since the PCMCIA card 44 is itself shielded, no interaction occurs between the electronics contained within the card 44 and the electronics and display panel 32 mounted within the case 30.

Finally, a rear access panel 56 is provided to allow a thin set of rechargeable batteries to be mounted within the display tablet case 30. While the use of small high energy density rechargeable batteries is preferred, the power consumption requirements of the display tablet 22 can be managed closely to minimize the power load that is required to be supported in the normal operation of the display tablet 20. The refresh frequency and brightness of the display panel 32 may be reduced during periods of perceived inactivity. The electronics implemented within the display tablet 20 using CMOS and low current draw analog components. The transmission power produced by the on board transceiver connected to the antenna 42 may be selectively reduced to meet a minimum acceptable noise margin. This may have the additional benefit of reducing the effective size of the restricted area 12 to an area specifically appropriate to the unique location of a particular display tablet, thereby reducing the possibility of signal interception and unnecessary cross-talk. Finally, subsystems such as the PCMCIA card 44 and multimedia support circuitry providing signal and power to the speakers and transducer 40 can be selectively powered down when their use is not needed or desired. As a result, the portable display table 20 should have a battery life of from two to four hours.

Figure 3:
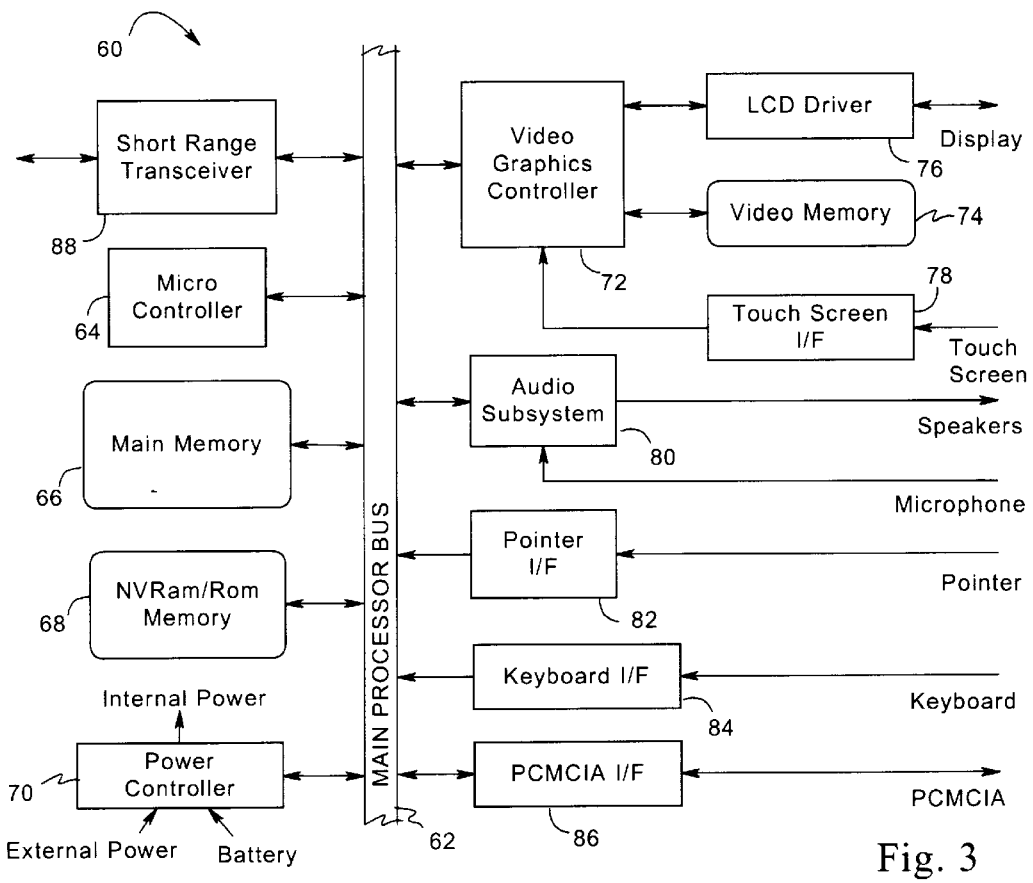
FIG. 3 provides a block diagram of the embedded control system as implemented in a preferred embodiment of the present invention.

A block diagram of the internal electronic control system 60 for a display tablet 20 is shown in FIG. 3. The control system 60 is preferably constructed as a low-cost embedded microprocessor control system utilizing a main processor bus 62 to provide a data and control interconnect between a microcontroller CPU 64 and a main memory bank 66. The microcontroller 64 can be directly implemented utilizing any of a wide number of a existing low-power, high-performance microcontrollers, such as the Intel™ 80C51 series, the Intel™ 80C196KB high performance CHMOS microcontroller, or the like.

The main memory 66 is preferably constructed utilizing approximately two megabytes of low-power dynamic RAM memory. While the display tablet 20 will support the execution of almost any number of complex applications, the resident main memory 66 need not be of significant size. The application programs are executed on the host computer 14 while, in the preferred embodiment, the operation of the display tablet is strictly limited to the terminal display of graphic and related data. Thus, the main memory 66 is preferably sized sufficient to allow execution of a control program implementing primarily the display function of the tablet 20 independent of the actual execution of the application program. Consequently, not only is the size of the mean memory 66 both reduced and largely non-critical in relationship to the complexity and type of application programs executed by the host computer 14, but the microcontroller 64 is not constrained by compatibility issues with regard to the type of CPU utilized by the host computer 14 or the specific type and version of the operating system executed.

Some combination of non-volatile RAM and ROM memory 68 may be provided to store at least a portion of the control program that is executed by the microcontroller 64. The non-volatile RAM/ROM memory 68 preferably stores at least a portion of the control program sufficient to enable the microcontroller 64 to download the remaining portions or full new image of a control program from the host computer 14. To permit future upgrades of event the permanently resident portion of the control program, non-volatile RAM memory can be utilized to allow field upgradability.

A conventional power controller 70 provides for the regulation of power to the control system 60 from either an external power source or the onboard battery. Power controller 70 preferably is programmable by the microcontroller 64 to selectively provide power to separate subsystems of the controller 60. The microcontroller 64 is therefore able to effectively manage power consumption by the control system 60 as a whole. Specifically, independent power regulation may be provided for an audio subsystem 80, PCMCIA interface 86 and a short range transceiver 88. Power may be regulated selectively for other components of the control system 60 where continued or excessive power consumption is unnecessary or undesirable. The separate regulated power supplies from the power controller 70 to the various components of the control system 60 is represented in FIG. 3 collectively as the internal power source provided by the power controller 70.

A generally conventional video graphics controller 72 is provided as the control interface for managing the operation of the display panel 32. The video graphics controller 72 may internally implement a simple hardware graphics adaptor or more complex hardware graphics accelerator for enhancing the effective speed of the video graphics controller 72 and, in general, the perceptible performance of the display tablet 20.

Depending on the resolution supported by the video graphics controller 72, including color depth, a conventional video memory array 74 is provided as frame and scratch-pad memory for use by the video graphics controller 72. Generally, a minimum of 1 megabyte of video memory 74 is sufficient to support a display panes 32 resolution of 640×480 at a color depth of 8 bits. The video memory 74 may be expandable to two, four or more megabytes of memory as appropriate to support the function of video graphics controller 72.

A conventional LCD driver circuit 76 is also connected to the video graphics controller 72 to generate the control and driver signals necessary to directly operate the display panel 32.

Finally, a touch screen interface 78 may be provided to support a touch screen function in connection with the display panel 32. The video graphics controller 72 may include circuitry for operating and responding to the touch screen interface 78 as needed to digitally represent a screen touch. This information is then available for use by the microcontroller 64 in much the same manner as any other pointing device information is made available by the microcontroller 64.

The audio subsystem 80 preferably includes the conventional functionality of multimedia peripheral cards for personal computers. The preferred supported functions include digital-to-analog conversion and power amplification of stereo audio channels as appropriate to drive the speakers 40. The audio subsystem 80 preferably also includes an analog-to-digital converter connected to the transducer 40. Additional analog or digital signal processing circuitry may be provided to reduce noise and eliminate feedback from the speakers 40 prior to or after the analog-to-digital conversion is performed by the audio subsystem 80.

A pointer interface 82 provides a typically parallel digital data interface between the pointer device and a microcontroller 64 via the main processor bus 62. Similarly, a keyboard interface 84 provides a typically parallel digital interface between the keyboard 34, including support for n-key rollover, and the microcontroller 64. Both the pointer interface 82 and keyboard interface 84 and possibly other components of the control system 60 may be implemented in part or in whole as on-chip components within the microcontroller 64 in a conventional manner. Naturally, the use of higher degrees of integration tends to reduce the complexity and cost of the control system 60 and, therefore, the cost and complexity of the display panel 20 overall.

Finally, a PCMCIA interface 86 provides a preferably 16-bit wide, high-speed parallel interface between the connector or connectors supported by the PCMCIA slot 46 and the main processor bus 62. The PCMCIA interface 86 itself is preferably implemented through the use of a conventional PCMCIA interface controller chip.

Figure 4:
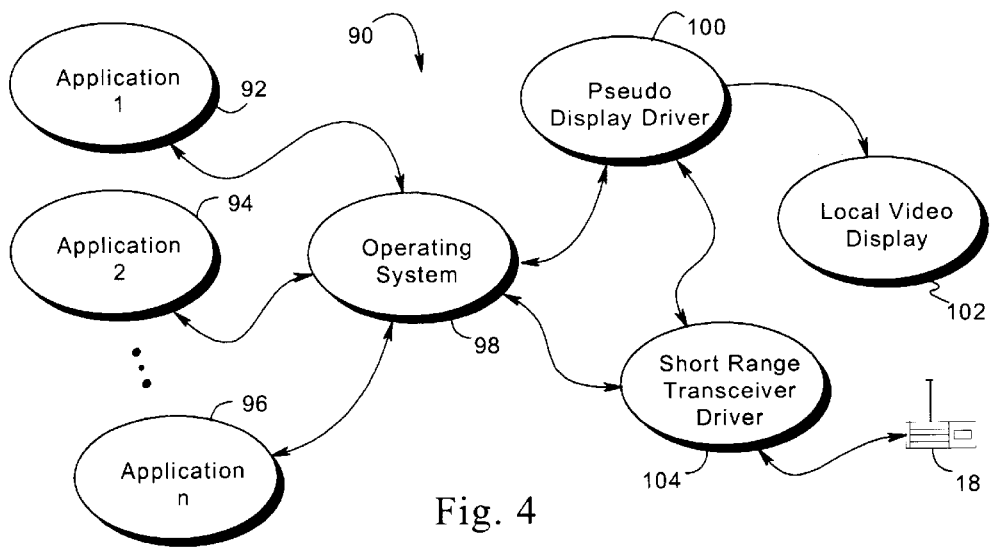
FIG. 4 is a representational data flow diagram illustrating the relationship between multiple application programs executing on the local host computer system that combine to provide a graphical data stream to a transceiver for communication to a portable display tablet.

The preferred application execution environment 90 supported by the host computer system 14 is shown in FIG. 4. Any number of applications can be executed concurrently by the host computer 14 in accordance with the normal operation of the operating system 98 or, as in the preferred embodiment, subject to an effective partitioning of the operating system execution states to support concurrent execution of the multiple applications by an otherwise single-user operating system. In both events, the applications 92, 94, 96 present calls to the operating system 98 including, in particular, calls relating to the display and update of images on a respective display. These displays, however, are logical displays that are mapped by the operating system 98 into a single master logical display space utilizing, as appropriate, windowing and desktop paradigms for the presentation of the composite master logical display. That is, the master logical display is drawn by the operating system 98 by a series of appropriate low-level display driver calls to a display driver.

In the preferred embodiments of the present invention, a pseudo-display driver 100 is provided to manage the detailed presentation of a master logical display within a window of another master logical display corresponding to another partition of the execution environment supported by the operating system 98. The pseudo-display driver 100 effectively operates to intercept low-level display driver calls from any or all of the operating system execution partitions. The output of a executing partition may be directed to an independent display, such as the local video display 102 or passed substantially unaltered to a short-range transceiver driver 104. In an initial implementation of the present invention, the short-range transceiver driver 104 and the low-power transceiver 18 are instantiated once for each display tablet 20 supported by the host computer system 14. Thus, the display driver calls from a single executing partition of the operating system 98, or multiple partitions operating in collaboration, are passed as a driver call stream to the short-range transceiver driver 104 for transmission to a corresponding display tablet 20. Outbound audio data and inbound pointer and audio data are processed through the short-range transceiver driver 104. Outbound audio data and inbound input and audio data may be transferred directly between the operating system 98 and short-range transceiver driver 104 subject to maintaining the correlation between the applications executing within the execution partition of the operating system 98 associated with the particular instantiation of the short-range transceiver driver 104 corresponding to that partition. Consequently, a proper association both for inbound and outbound data for specific applications is maintained through the operating system 98 as between the local video display 102 and any number of display tablets 20.

A preferred alternate embodiment of the present invention preferably provides for a single short-range transceiver driver 104 that is effectively aware, as is the pseudo-display driver 100, of the multiple partition execution space of the operating system 98. This alternate short-range transceiver driver 104 preferably supports a multi-channel spread spectrum transceiver 18. Display and analog output data associated with execution partitions of the operating system 98 respectively directed for transmission to a particular display tablet 20 to implement the low-level display driver. Consequently, the appropriate physical display, either the local video display 102 or a display tablet 20 is updated consistent with the ongoing execution of the corresponding operating system partition. The short-range transceiver driver 104 may further provide for variable encryption and decryption of the low-level driver call data streams that pass through the driver 104. Destination signatures may also be included into the data streams to specifically identify the particular recipient host computer 14 and display tablet 20 that are intended to be exclusively communicating over a particular channel supported by the transceiver 18. This provides both security over an appropriate interception of the transmitted data as well as secure validation that data streams are being sourced and received by the intended participants.

Figure 5:
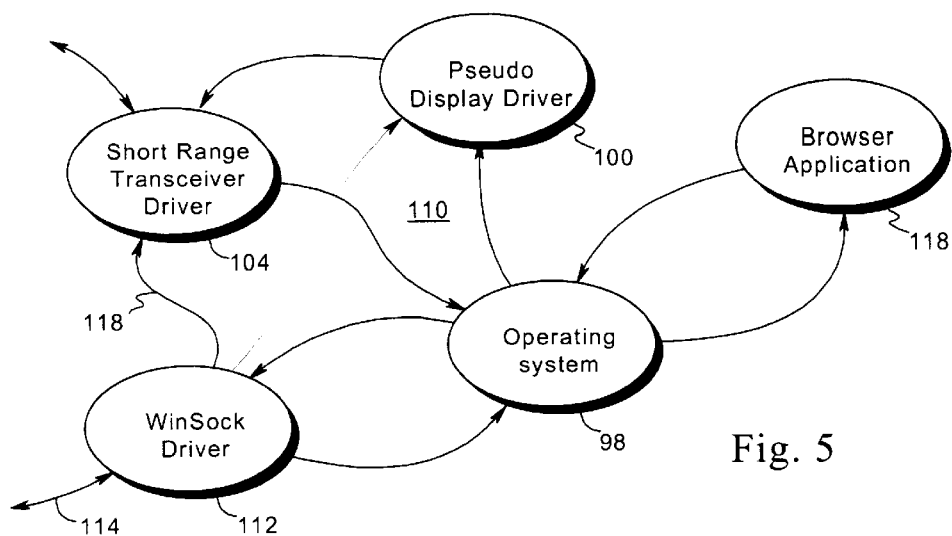
FIG. 5 provides a data flow diagram illustrating the selective bypass of pre-existing compressed data blocks by operation of a WinSock compliant driver in the execution of a browser application by the local host computer system.

A detail 110 of a preferred embodiment of the present invention is illustrated in FIG. 5. The detail 110 demonstrates a performance optimization as preferably implemented for a particular class of applications that may be executed on the host computer 14. This class of applications, including potentially operating systems, are defined as those that receive data as clients that has been encoded, encrypted or compressed in some form to minimize communication latency and to maximize reproducibility.

A Web browser application is a preferred example. Nominally, the client application itself is charged with the responsibility to decode, decrypt or decompress data for presentation. Various graphical images transmitted to browser applications are encoded and/or compressed using various lossy or lossless algorithms to substantially reduce the transmitted data size. In a relationship to this class of application, the present invention implements a processed data bypass that allows the encoded, encrypted or compressed data as received by the host computer 14 to be transferred in an unaltered form to a portable display tablet 20. Since data transferred in an encoded, encrypted or compressed form is done subject to a public algorithm specification, no compatibility issues arise by allowing the microcontroller 64 with implementing the unencoding, decrypting or decompression algorithm yet maximizing the effective utilization of the bandwidth connection between the portable display tablet 20 and host computer system 14.

A complication arises particularly in Web browser applications. There, the rendered display is content dependent. Therefore, display dependencies are resolved dynamically by the application based on the final representation of any unencoded, decrypted and decompressed data. In such circumstances, the host computer system 14 must provide for full processing of the received data in support of the otherwise ordinary operation of the application as needed to produce a finally determined impression of the information to be displayed by a display tablet 20. This is handled in the present invention on the host computer 14 side through the further implementation of the host system detail 110. A socket driver 112, conventionally referred to as a WinSock driver in relationship to MicroSoft operating systems, manages a network socket connection 114 to a remote computer system that is the source of encoded, encrypted or compressed data. The WinSock driver 112 effectively supports bi-directional data transfer between the driver 112 and operating system 98 in support of the pseudo-display driver 100 and an exemplary Web browser application 116. The WinSock driver 112 is typically merged with the operating system 90 to extend the application program interface (API) that is presented to the browser application 118.

The WinSock driver 112 is preferably modified to identify objects such as compressed data images from the inbound socket data stream 114. The object is identified by the driver not only as being subject to immediate bypass 118 to the short-range transceiver driver 104, but further that the socket data stream carrying the object is destined for a particular application 116. Thus, the short-range transceiver driver 104 is provided with both the bypassed data object and at least an identification of the particular portable display tablet 20 that is to receive the object. The data object as passed to the short-range transceiver driver 104 and, in parallel, to the operating system 98 with a unique identification tag generated by the WinSock driver 112. This tag is associated with the data object in the socket data stream ultimately for use by the pseudo-display driver 100. Preferably, the data object tag and the communication of the tag to the pseudo-display driver 100 is provided logically separate from the socket data stream that is provided through the operating system 98 to the browser application 116. Consequently, an entirely conventional browser application 116 may be utilized in connection with the present invention without loss of performance or compatibility. Data objects received by the browser application 116 are therefore conventionally unencoded, decrypted, and decompressed and used if and as necessary to resolve dependencies on, for example, the size and location of a graphic image in relationship to text within the browser applications current logical display. That is, the browser application 116 processes the received socket data stream and produces a series of operating system calls to define the appearance of the logical display window controlled by the browser application 116.

Operating system display calls are further reduced by the operating system 98 to low-level display driver calls that are passed to the pseudo display driver 100. Based on an examination of the various data objects identified to the pseudo-display driver 100 in connection with the low-level display driver calls, respective unique identifying data object tags are identified by the pseudo-display drive 100. Each tag, as identified, is used to replace the unencoded, decrypted or decompressed representation of the corresponding data object. Thus, only display driver calls referencing data object tags and untagged data are processed through the pseudo-display driver 100 to the short-range transceiver driver 104 for transmission to a portable display tablet 20.

In the preferred embodiment of the present invention, the short-range transceiver driver 104 operates to transmit fixed block size data packets that together convey messages to a display tablet 20. A message can be a data object received from the WinSock driver 112. Other messages include a low-level device driver call and as appropriate for the call, a display object tag or an untagged data object as received from the pseudo display driver 100. A tagged data object identified and provided from the WinSock driver 112 will therefore be at least queued for transmission to a corresponding display tablet 20 prior to a display object tag being provided by the pseudo display driver 100 to the short-range transceiver driver 104 for transmission to the same display tablet 20. Furthermore, the latency between the transmission of the data object itself and transmission of the tag allows a quite adequate amount of time for the microcontroller 64 to receive and, as appropriate, process the data object into an unencoded, decrypted or decompressed form. The actual latency incurred at different times will be determined by operating system and browser application 98, 116 executed and latencies that control the generation of display driver calls by the operating system 98 to the pseudo display driver 100 to pass a data object tag to the short-range transceiver driver 104.

Figure 6:
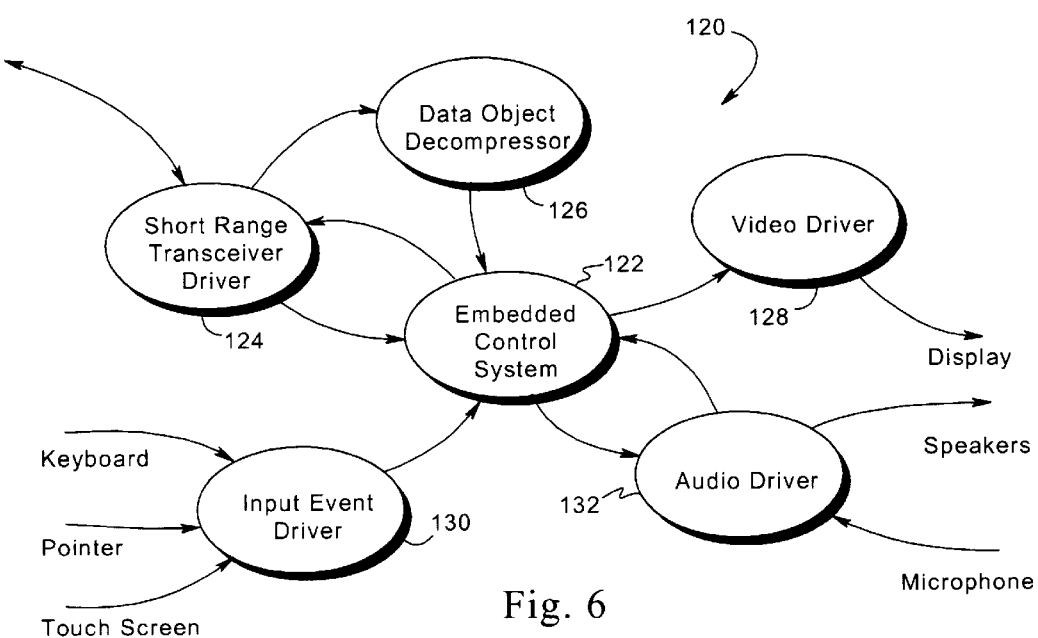
FIG. 6 provides a data flow diagram illustrating the processing of graphical and other output data directed to a portable display tablet and the collection of input data from any number of sources for return to the local host computer system.

Referring now to FIG. 6, a top level software detail 120 of the control program is shown in accordance with a preferred embodiment of a portable display tablet 20. An embedded control system 122 is the central component of the control program 120. Preferably, the embedded control system 122 implements an interrupt-driven, light weight threaded core that efficiently supports operation of a short-range transceiver driver 124, a data object decompressor 126, a video driver 128, an input even driver 130, and an audio driver 132. Multiple threads are implemented by the embedded control system 122 primarily in support of overlapping and out-of-order data transfers with respect to the short-range transceiver driver 124. The short-range transceiver 88 on the display tablet 20 supports a single active transceiver data channel. The tag provided with or in place of a data object includes an identification of the particular application data stream associated with the object. The embedded control system 122 allocates a separate thread for handling each uniquely identified application data stream and thereby conveniently managing overlapping and out-of-order data transmissions. While a non-threaded core could be utilized, the use of a conventional multi-threaded core within the control system 122 is preferred as providing a more convenient transactional platform for supporting multiple application data streams.

Tagged data objects received by the short-range transceiver driver 124 are transferred to the video image decompressor 126. A number of different algorithms may be implemented by the video image decompressor 126 to be selectably used as appropriate for the particular nature of the data object passed from the short-range transceiver driver 124. In many instances the data object will be a graphics image presented in any of a number of compressed forms. Typically, the compressed data object itself identifies the type and version of the algorithm necessary to decompress the data object. The object is decompressed and the resulting video image and unique object identification tag are cached by the embedded control system 122 for subsequent use.

Untagged data objects and bare data object identification tags are passed directly from the short-range transceiver driver 124 to the embedded control system 122 for evaluation. Decompressed graphics images are substituted for their corresponding unique identifying object tags and an ordered set of low-level drawing commands and data effectively corresponding to the received data stream is then provided to the video driver 128. In turn, the low-level display driver commands and data are interpreted and executed by the video driver 128 to directly provide for the presentation of a corresponding image by the display panel 32.

The data stream received by the short-range transceiver driver 124 may also include low-level commands, data and potentially unique object tags that are to be directed to the audio driver 132. The commands and data directed to the video driver 128 and audio driver 132 are independently routed by the embedded control system 122 to the appropriate driver 128, 132. Where the application data stream includes audio driver commands that reference a unique object identification tag, the embedded control system 122 again searches the local object cache for a corresponding expanded object. As with graphic data objects, compressed audio data objects also encode an identification of the decompression or decoding algorithm necessary to process the data object. Thus, the object decompressor 126 processes the compressed audio data object utilizing the appropriate algorithm. The audio commands, untagged data objects and substituted decompressed data objects are then provided to the audio driver 132 for execution and presentation by the speakers 40.

The audio driver 132 also produces an inbound application data stream from the audio transducer, when enabled. A resulting digital data stream is passed from the audio driver 132 to the embedded control system 122 for return within a message of an appropriate application data stream through the short-range transceiver driver 124 to the host computer 14. The appropriate application data stream is identified potentially from the application data stream that last previously enabled operation of the transducer through the audio driver 132. The digitized audio data gathered by the audio driver 132 may be passed directly through to the short-range transceiver driver 124 for transmission. Alternatively, the embedded control system 122 may direct the digital audio stream through the object decompressor 126 to perform audio compression prior to transmission. By compressing this audio data prior to transmission, a substantial portion of the bandwidth available to the short-range transceiver 88 is preserved while introducing minimal latency due to the operation of the compression algorithm.

The input event driver 130 receives, manages and provides keyboard, pointer and touch screen input data to the embedded control system 122. This input data is directed by the embedded control system 122 to the short-range transceiver driver 124 for transmission in the form of call messages to the host computer system 14. However, such input data is not immediately associated with a particular application data stream by the embedded control system 122. Rather, the input data is identified only generically by type of information prior to transmission. In accordance with the preferred embodiments of the present invention, the operating system 98 appropriately determines the particular application that is currently set to receive input from the keyboard, printer and touch screen. In certain circumstances, this may be the operating system 98 itself and in other circumstances, the currently active application execution partition of the operating system 98. Consequently, the control program 120 operates to effectively support any number of applications being executed on the computer system 14 implicitly by the identification of their respective application data streams as received by the short-range transceiver driver 124. The embedded control system 122 is also capable of associating inputs specifically with the transceiver data streams as appropriate to maintain the integrity of each individual application execution partition of the operating system.

Figure 7:
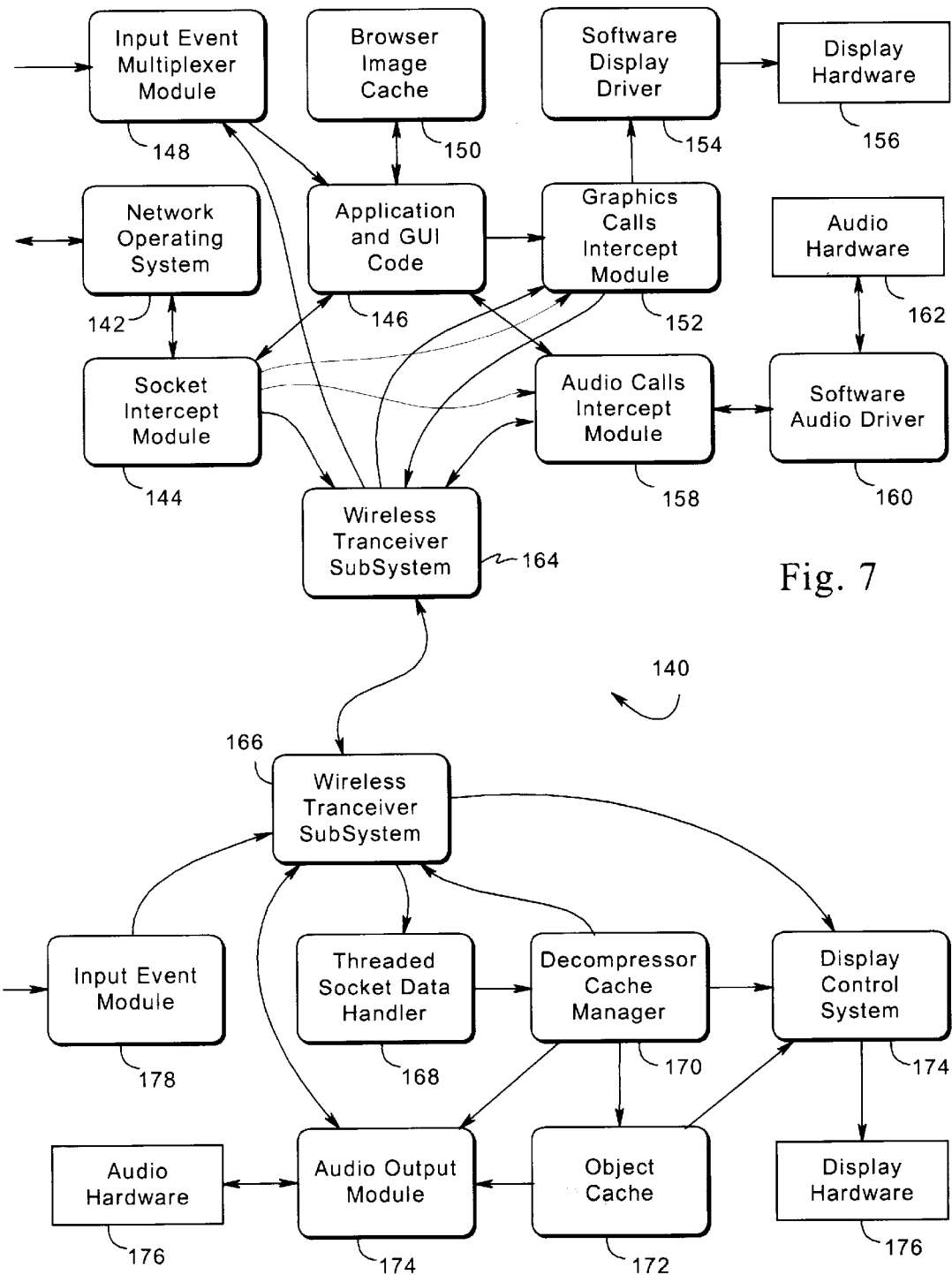
FIG. 7 provides a flow diagram detailing the modular control program implemented on a base computer system for communicating with a portable display tablet and of the modular, preferably a firmware based control program as implemented in a portable display tablet in accordance with a preferred embodiment of the present invention.

The detailed control and data flow relationships between the host computer system 14 and a display tablet 22 is shown in FIG. 7. The network operating system component 142 of the operating system 98 executed by the host computer system 14 implements a TCP/IP or similar network communications protocol. A socket intercept module 144 is provided in accordance with the present invention to filter, identify and bypass compressed data objects subject to predefined conditions to a wireless transceiver subsystem 164. The predefined conditions include the specific data object compression forms that can be handled by a particular model of a display tablet 20 and that a wireless connection has been established with a valid display tablet 20. All of the data received by the socket intercept module 144 is identified by the number of the particular socket connection that receives the data. All conventionally valid data received by the socket intercept module 144 is provided to the application that owns the corresponding socket connection as determined and defined through the core operating system 146, including the graphical user interface (GUI) module. An input event multiplexer module 148, established in accordance with the present invention, receives input event data and associates the events with a corresponding execution partition through the core operating system 146.

The application executing within a partition of the core operating system 146 may maintain a private data space. Where the application is a browser, a browser image cache 150 is supported to hold decompressed image data that can be repeatedly referenced on repeated application access requests for the corresponding compressed data object.

Independent of whether a compressed data object is requested from and immediately received through the socket intercept module 144 or from a browser image cache 150, particularly as determined by the browser application itself, the core operating system 146 issues low-level graphics calls and accompanying data through a graphics calls intercept module 152. Where the local display of the host computer system 14 is controlled by an application within the current execution partition of the operating system kernel 146, the display graphics calls and object data are passed as received to the software display driver 154 for final processing against the display hardware 156.

The unique identifying tag assigned to a data object by the socket intercept module 144 is identified by the graphics calls Intercept module 152. The identifying tag is then substituted for the actual data object within the application data stream of low-level graphics calls and data. The resulting modified data stream is then directed to the wireless transceiver subsystem 164.

Similarly, the operating system kernel directs low-level audio calls and data to an audio calls intercept module 158. Any tagged data objects, as previously identified by the socket intercept module 144, are held in a dedicated cache by the operating system kernel 146. When a tagged data object is cached, the tag is provided to the audio calls intercept module 158. The low-level audio calls and data may be passed locally to the software audio driver 160 for final processing by the audio hardware 162. The low-level audio calls, with all tagged data objects substituted by their tags, may be separately or collaboratively transferred to the wireless transceiver subsystem 164.

The wireless transceiver subsystem 166 receives an assigned channel of data. The channel data is provided to a multi-threaded socket data handler 168 that operates to segregate the channel data into separate threads corresponding implicitly to the separate socket data threads as then identified by the socket intercept module 144. The decompressor cache manager 170 effectively multiplexes between the different data threads to identify compressed data objects. As each compressed data object is encountered, the decompressor cache manager 170 appropriately decompresses the data object and stores the decompressed object in an object cache 172 as established in the main memory 66 by operation of the control program 120. If the object cache 172 fills, given the finite amount of main memory 66 allocable as the cache 172, the decompressor cache manager 170 sends an invalidating message to the wireless transceiver subsystem 164 with an identification of the image tag of the least recently used object in the image cache 172 that is being invalidated. This message is returned to the graphics calls intercept module 152 that manages a list of all valid tagged objects within the image cache 172. Thus, whenever the application and GUI code module 148 directs the transfer of an untagged data object, a tagged compressed data object can be quickly formed from the data provided by the application and GUI code module 146 and forwarded through the wireless transceiver subsystem 164.

When the thread handler 168 provides a tagged data object reference to the decompressor cache manager 170, a list of valid tags maintained by the cache manager 170 is checked to select a corresponding data object from the image cache 172 for transfer to the display control system 174. These data objects, in connection with the graphics call stream passed through the wireless transceiver subsystem 166 are then utilized by the display control system 174 to compose a composite display image that is presented on the panel 32 by the display hardware 176.

Audio sound clips are handled through the decompressor cache manger 170 in a manner generally similar to graphics data objects. The socket intercept module 144 identifies audio clips within the network channel data stream as another specific form of compressed data object. The compressed audio data object is bypassed immediately to the wireless transceiver subsystem 164 while, at the same time, being passed to the application core operating system module 146. The audio calls intercept module 158 maintains a list of the data object tags associated with bypassed compressed audio data objects. As references to tagged data objects are received by the audio calls intercept module 158, tag substitution is again performed prior to the audio low-level call being forwarded to the wireless transceiver subsystem 164.

The threaded socket data handler 168 receives and distinguishes a message as containing an audio command and a compressed audio data object. The threaded socket data handler 168 passes the object to an appropriate multiplexer channel of the decompressor cache manager 170 for storage in the image cache 172 as any other data object. However, unlike graphics data objects processed through the decompressor cache manager 170, compressed audio data objects may be stored directly in the object cache 172 where the necessary decompression routine for the audio data is supported directly in the hardware of the audio output module 174. Alternately, the decompressor cache manager 170 may operate stream decompress and pass the audio data object to the audio output module 174 without storing the object in the object cache 172. The decompressor cache manager may alternately perform a preprocessing function on compressed audio data objects to transform the compression representation of the object or partially decompress the object to a point where dedicated hardware provided in the audio output module 174 can complete any required further decoding and decompressing as the audio data object is streamed to the audio hardware 176.

The audio hardware 176 includes the transducer 40 of the display tablet 20. Inbound audio is routed by the audio hardware 176 to the audio output module 174. In a preferred embodiment of the present invention, the audio output module 174 compresses and encodes the inbound audio stream to the extent supported by the hardware of the audio output module 174. The stream of audio data objects produced from the audio output module 174 are passed to the wireless transceiver subsystem 166 for transmission through the wireless subsystem 164. These inbound audio data objects are then passed to the audio calls intercept module 158 for selective reintegration into an appropriate application execution partition of the core operating system module 146. Consequently, the executing application expecting audio input from the audio hardware 176 receives the audio data object stream as though acquired through the software audio driver 160 and audio hardware 162.

Finally, an input event module 178 receives and processes keyboard, pointer and touch screen input information into a corresponding set of inbound input event messages that are forwarded ultimately to the input event multiplexer module 148. The received input events are matched through the input event multiplexer module 148 to the appropriate application execution partition of the core operating system module 146. Thus again, the partition executing application receives the input events as though locally generated by the host computer system 14 itself.

Figure 8:
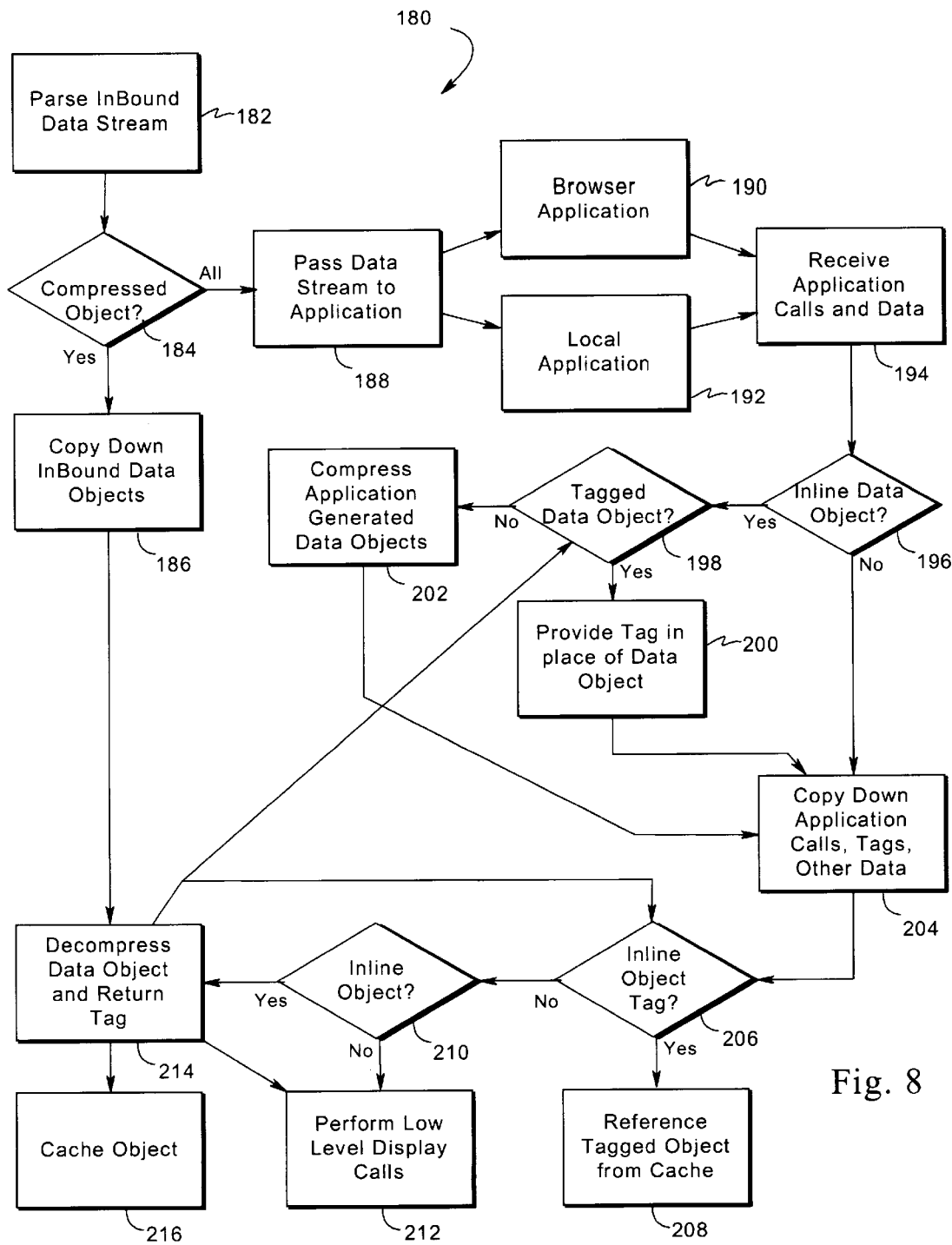
FIG. 8 provides a flow chart detailing the processing of both pre-compressed and uncompressed data through a control program executed by the local host computer system and the correlation of each of the data blocks through their transmission to and decompression by the control system of a portable display tablet constructed in accordance with a preferred embodiment of the present invention.

A combined data flow 180 further detailing the handling of compressed data objects is shown in FIG. 8. As shown, the flow 180 handles both network received and locally or host generated compressed data objects. Network originated compressed data objects are parsed from the inbound network data steam 182. As individual objects are identified and determined to be of a compressed form that can be handled directly by the control program 120, the compressed data objects are routed 184 for copy down 186 directly to the control program 120.

The inbound network data stream is processed generally by the operating system of the host computer 14 and passed 188, as appropriate, to applications 190, 192 executing on the host computer system 14. In the case of a browser application 190, or the like, compressed data objects are frequently requested and received from the inbound data stream 182. Conversely, a local application 192 may not receive any externally originated compressed data objects that can be directly handled by the control program 120. Indeed, the local application 192 need not receive any data from the network data stream 182. In any event, the browser application 190 and local application 192 may manipulate any received data objects, including decompressing and decoding the objects. Both the browser and local applications 190, 192 may function to generate new data objects.

Both the browser application 190 and local application 192 ultimately issue calls to the operating system executing on the host computer 14. These calls and accompanying or referenced data objects are received 194 by the operating system. A series of low-level calls and data objects responsively generated by the operating system is then passed to the pseudo-display driver 100, for example. The series of calls and objects are processed to particularly distinguish data objects and call commands 196.

Data objects are examined to distinguish 198 between tagged and untagged data objects. At a minimum, tagged data objects can be identified by comparing at least a signature of the data object to a local list of known tagged data objects maintained by the pseudo-display driver 100. Where a signature match is found, the corresponding tag is provided 200 in place of the data object. The data object tag is then prepared 204 as part of a message for copy-down to the control program 120.

Where a data object fails to match a known tagged object signature, the data object is assumed to have been created locally by the applications 190, 192. Such local data objects are first compressed 202 and prepared 204 for copy-down to the control program 120.

As each message is prepared for copy-down 204 individual messages are identified by thread and multiplexed for transmission to the wireless transceiver subsystem 166.

Once received by the control program 120, a message is examined 206 to determine whether the message includes a data object tag. A control program local list of known object tags is scanned to determine if a corresponding pre-decompressed data object is present in the object cache 172. When a matching data object tag is found, the tag is replaced 208 with a pointer to the corresponding pre-decompressed data object stored in the object cache 172. Preferably, the data object is identified by reference thereby reducing memory-to-memory data copies of the tagged data objects. A message is then further examined 210 for the existence of compressed inline data objects. Each identified inline data object is then decompressed 214. The inline data object may then be selectively provided with a local data object tag generated by the control program 120. By default, inline data objects that are greater than an empirically selected default size of five kilobytes are tagged by the control program 120. A flag provided as part of a message including a data object may be used to explicitly determine whether the inline data object is to be tagged or not by the control program 120. The data object, regardless of whether tagged or not is then cached 216 in the object cache 172. Untagged data objects will have the lowest priority for remaining in the cache 172. Where a tag is generated by the control program 120, a copy of the new data object tag is added to the local lists of known data object tags that are utilized in identifying tagged data objects 198, 206 on both the host computer system 14 and display tablet 20. These lists are updated as appropriate whenever tagged data objects are newly cached or expired from the cache immediately or by cache flush. The host list is preferably updated with respect to control program generated tags based on a memory management model executed as part of the pseudo display driver 110. Alternately, whenever the control program 120 updates its tag list, a message directing a corresponding update to the tag list maintained on the host computer system can be generated and returned by the control program.

Finally, a reference to the cached data object is placed into the stream of application calls within the message. The calls and referenced data objects are then implemented 212 by forwarding to the display control system module 174. Display calls that reference cached data objects operate to copy at least selected portions of the data objects to the memory 74 as appropriate to carry out the application call. Consequently, the density of data objects transmitted to the portable display tablet 20 is maximized for both network and local host generated data white minimizing the display latency impact due to the limited available transmission data bandwidth between the host computer system 14 and display tablet 20.

Figure 9:
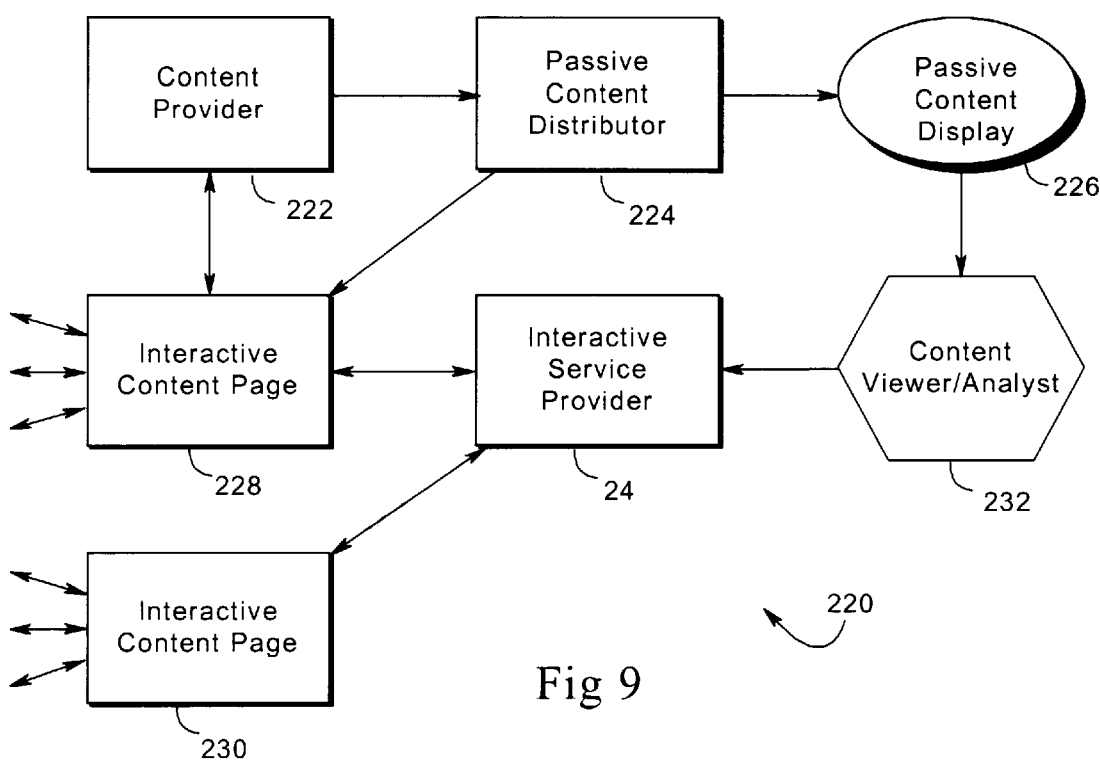
FIG. 9 is block diagram illustrating the operative relationship between passive and interactive content distributors in providing interactive content correlated to the current passive content data in accordance with a preferred use of the present invention.

As will be appreciated, the ability to operate a number of portable display tablets 20 at entirely end user determined locations within the restricted area 12 while allowing independent and collaborative operation as desired with each display tablet 20 having access to the full resources presented by and through the host computer 14 defines a new computing system paradigm that avoids all of the disadvantages associated with a NC-type thin client. FIG. 9 provides an illustration 220 of a paradigm use of the present invention that demonstrates the functional distinctions between the present invention and NCs.

In an exemplary context, a content provider 222 conventionally provides a non-interactive or passive content program, such as a news report or movie, to a passive content distributor 224 that provides for the mass distribution of the program at scheduled times and dates. These programs are viewed utilizing a conventional passive content display 226, nominally a television, radio or other typical mass communications device. While the program is being displayed, use of a NC utilizing the television as the NC display is greatly, if not completely, compromised.

In accordance with a use of the present invention an information based adjunct to the programs developed by the content provider 222 including a user directed hypertext oriented interactive content is provided at a web site supporting an interactive content page 228. The web page or pages then presented may reference substantial material provided to the interactive content page site from any number of content providers. In accordance with the present invention, the interactive content page site 228 is also provided, directly or indirectly by the passive content distributor 224, with a schedule of when particular programs are to be distributed. Accordingly, in a conventional manner, the interactive content page presented by the site 228 is dynamically modified to provide and highlight interactive content directly corresponding to the program or programs currently being distributed as such programs are received on various passive content displays 226.

Potentially multiple portable display tablets 20 operated by viewers can be fully and independently utilized while a current program is being presented on the passive content display 226. These content viewers 232 may separately operate their display panels 20 to obtain mutual access through the interactive service provider 24 to the interactive content page site 228. Each of the content viewers has independent, interactive user directed access to the information presented by the interactive content page site 228. Thus for example, a content provider 222 of a news program may provide extensive supplemental information that compliments a particular story within the news program to the website hosting the interactive content page 228. The content viewer 232 is thus able to personally and interactively select additional levels and views of information as individually desired. Consequently, a passive content program can be made functionally interactive in a convenient manner through the use of the present invention. Of course, should a content viewer 232 be uninterested in a currently displayed program, that viewer maintains independent access to the full resources of the host computer 14 for executing local applications and communications applications for accessing the Internet.

Thus, a portable display tablet, new thin-client oriented computer system paradigm and methods for operating such clients within the paradigm have been described. While the present invention has been described particularly with reference to casual end users, use of the portable display tablets, applications of the present invention are not so limited. Business and industrial applications of the present invention can be readily made where operation of one or more portable display tablets within a restricted area facilitates the concurrent independent and collaborative access to resources presented by a host computer system to one or more users working within the restricted area. Furthermore, a display tablet consistent with the present invention is not restricted to operating with only a single host computer. Rather, through the implementation of conventional authentication codes and procedures, selection can be made of a particular host or set of host computers that may be called upon to support the operation of a display tablet in a single restricted area, overlapping restricted areas, or fully independent restricted areas. Furthermore, while the host computer system of the present invention has been described as stationery, the host computer system can, indeed, be mobile with the portable display tablet used within a relative restricted area.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

We claim:

1. A computer system coupleable to a wide area network directly or through a local area network, for providing computing services within a predetermined area, said computer system comprising
   a) a host computer providing for the execution of a host program that provides a stream of graphics display commands and graphics display data objects that, when graphically rendered, represents an interactive graphical user interface, and that is responsive to user provided input data;
   b) a host wireless transceiver coupleable to said host computer, wherein a portion of said wireless transceiver is locatable within said predetermined area to enable the wireless exchange of said stream and said user provided input data; and
   c) one or more interactive graphical display tablets operable within said predetermined area with respect to said host computer, each of said interactive graphical display tablets including:
      i) a graphics display suitable for presenting said interactive graphical user interface;
      ii) a data input device for collecting said user provided input data;
      iii) a tablet wireless transceiver for exchanging said stream and said user provided input data; and
      iv) a processor, coupled between said graphics display, said data input device, and said tablet wireless transceiver, providing for the execution of a control program implementing graphics display commands that provide for the rendering of graphics display data objects,
   wherein said host computer selectively provides modified graphics display commands and selectively omits providing graphics display data objects as said stream to said host wireless transceiver.

2. The computer system of claim 1 wherein execution of said control program provides for the implementation of device driver level display commands that provide for the execution of graphics display commands.

3. The computer system of claim 1 wherein said tablet wireless transceiver operates as a low-power transceiver within a predetermined band of radio frequencies.

4. The computer system of claim 1 wherein each of said interactive graphic display tablets further includes a case providing for the mutual support of said graphics display, said data input device, said tablet wireless transceiver, and said processor, said case providing first and second carrying points suitable for use both when said interactive graphic display tablet is held and operated by a stationary user and when carried during portable operation.

5. The computer system of claim 4 wherein said data input device is positioned adjacent said first carrying point suitably to permit use when said interactive graphic display tablet is held and operated by a stationary user and when carried during portable operation.

6. The computer system of claim 1 wherein said processor includes a memory storage area, wherein said control program provides for the ordered execution of display commands with reference to display data objects, and wherein execution of said control program provides for the receipt and storage of display data objects received aspecifically with respect to display command instances.

7. The computer system of claim 6 wherein said host computer identifies predetermined display data objects as received from said wide area network with respect to each of said interactive graphical display tablets and wherein said host computer provides said predetermined display data objects to their respective interactive graphical display tablets for storage pending the generation of corresponding display commands.

8. The computer system of claim 7 wherein said host program determines the position and portion of said predetermined display data objects, when graphically rendered by said interactive graphical display tablets, by generation of corresponding display commands.

9. The computer system of claim 8 wherein said host program generates display commands specific to each of said interactive graphical display tablets and wherein said host program is responsive in generating display commands to an application program executed by said host computer with respect to an associated one of said interactive graphical display tablets.

10. The computer system of claim 1 wherein said host computer executes one or more application programs with respect to a predetermined interactive display tablet, wherein said host program provides compressed display data objects to and tracks storage of compressed display data objects by said predetermined interactive display tablet, said host program transferring a predetermined compressed display data object from said stream to said predetermined interactive display tablet and a predetermined application program, said host program subsequently providing a predetermined reference to said predetermined compressed display data object in connection with a predetermined display command provided to said predetermined interactive display tablet, and wherein said predetermined interactive display tablet is responsive to said predetermined reference for selecting said predetermined compressed display data object for decompression and rendering in connection with said predetermined display command.

11. A computer system supporting one or more portable wireless interactive graphics displays operable within a predefined area, said computer system comprising:

a) a host computer system including a first processor that executes a communications program and an application program, and a wireless transceiver, coupled to said first processor, that transmits first data and receives second data; and b) a portable wireless interactive graphics display device that includes a second processor that executes a control program, a wireless transceiver that transmits second data and receives first data, an output display that graphically represents said first data, and an input device that provides said second data, said second processor being coupled between said wireless transceiver, said output display and said input device, wherein said host computer system, through execution of said communications program, provides encoded graphical data objects and data object tags within said first data to said portable graphics display device, said communications program establishing a relation between a predetermined encoded graphical data object and a predetermined data object tag, and wherein said portable graphics display device, through execution of said control program, utilizes said relation to select said predetermined encoded graphical data object following receipt of said predetermined data object tag.

12. The computer system of claim 11 wherein said second processor provides for the decoding of said predetermined encoded graphical data object suitably for display rendering, and wherein said second processor resolves said predetermined data object tag to an instance of said predetermined encoded graphical data object.

13. The computer system of claim 12 wherein said first data further includes display commands and display command data said second processor providing for the storage of encoded graphical data objects, execution of display commands associated with display command data and execution of display commands associated with data object tags.

14. The computer system of claim 13 wherein said host computer system selectively provides said portable graphics display device with an instance of said predetermined encoded graphical display data object and instances of said predetermined data object tag in conjunction with respective display commands.

15. The computer system of claim 14 wherein said host computer system selectively provides said portable graphics display device with said instance of said predetermined encoded graphical display data object separate from any particular display command.

16. The computer system of claim 15 wherein said host computer system prepares said instance of said predetermined encoded graphical display data object in connection with the generation of a predetermined display command.

17. A computer system comprising:

a) a host computer that executes an operating system and a predetermined application program, said operating system including a routine providing for the transfer of display commands and display data objects, as defined by execution of said predetermined application program and wherein said display commands reference corresponding display data objects, to a first wireless transceiver and for receipt of input data, from said first wireless transceiver, for transfer to said predetermined application program; and b) a portable graphics display device, including a second wireless transceiver, responsive to said display commands and said display data objects as received from said second wireless transceiver and that provides said input data to said second wireless transceiver, said host computer providing for the caching of selected said display data objects by said portable graphics display device for subsequent rendering and display upon reference by selected said display commands, and wherein said host computer selectively modifies said selected display commands to reference said selected display data objects and omitting the transfer of corresponding ones of said display data objects from transfer to said to said first wireless transceiver.

18. The computer system of claim 17 wherein said host computer, in execution of said routine, provides for the transfer of a compressed display data object to said portable graphics display device upon interception of said compressed display data object being provided to said predetermined application program.

19. The computer system of claim 18 wherein said host computer, in execution of said routine, alternately provides for the compression of a display data object produced by execution of said predetermined application program to provide said compressed display data object to said portable graphics display device.

20. The computer system of claim 19 wherein said compressed display data object is associated with a tag on transfer to said portable graphics display device, and wherein said routine provides a display command and reference to said tag to cause said portable graphics display device to decompress and use an instance of said compressed display data object in connection with the execution of said display command by said portable graphics display device.

* * * * *